Feb. 23, 1971   R. J. FISHER   3,564,735
TACTILE TOYS

Filed June 26, 1967   3 Sheets-Sheet 1

RAYMOND J. FISHER
INVENTOR.

BY *Leo M Kelly*
ATTORNEY

Feb. 23, 1971  R. J. FISHER  3,564,735
TACTILE TOYS
Filed June 26, 1967  3 Sheets-Sheet 2

RAYMOND J. FISHER
INVENTOR.

BY Leo M. Kelly
ATTORNEY

Feb. 23, 1971  R. J. FISHER  3,564,735
TACTILE TOYS

Filed June 26, 1967  3 Sheets-Sheet 3

RAYMOND J. FISHER
INVENTOR.

BY *Leo M. Kelly*
ATTORNEY

3,564,735
TACTILE TOYS
Raymond James Fisher, 222 Mason St.,
Woonsocket, R.I. 02895
Filed June 26, 1967, Ser. No. 648,590
Int. Cl. G09b 1/36
U.S. Cl. 35—73    7 Claims

ABSTRACT OF THE DISCLOSURE

Tactile toys are puzzle-type toys used to test and develop a person's powers of tactile apperception and differentiation. They are comprised of a plurality of interlocking parts, the facing surfaces of which have a distinct texture. In solving the puzzle, the user is required to segregate and connect the correct plurality of parts on the basis of tactile apperception and differentiation. Since all parts have some facing surface and since the plurality of parts includes at least one additional interlocking part, the facing surface of which has a different texture from all of the others, the user correctly solves the puzzle of the toy by either constructing a form which has a surface with a continuous regular texture or by recognizing that the assembled form has incorporated an interlocking part, the texture of which differs from that of the other interlocking parts.

---

This invention relates to toys and more particularly to tactile toys for educational, physiological, psychological and amusement purposes.

It is an object of this invention to provide a toy which may be used to teach people, including the very young child, to differentiate and to identify objects by texture as found on the facing surfaces of an assembled form having a familiar shape.

It is the further object of this invention to test and to train individuals of all ages to detect textural differences in the surfaces of segments of whole or disassembled objects and to recognize continuities or discontinuities of texture in assembled objects.

A further object of this invention is to provide an analytical tool having extensive use in physiological and psychological testing and training.

Still another object is to provide a device for the amusement of children and adults.

Other and further objects of this invention will be pointed out in the following specifications and particularly in the appended claims. In summary, this invention resides in a toy having a solid form, said solid form being constructed of a plurality of interlocking parts, the outer or facing surfaces of which parts have a distinct and common textural characteristic. In addition thereto, there is included with said plurality of interlocking parts at least one additional part that is substantially identical to one of the said plurality of parts in all respects except that it has a surface texture character which is different from that of the surface texture of the plurality of interlocking parts.

This invention requires the user to employ his sense of touch to differentiate between parts of objects which, in general, look quite similar and to distinguish between objects which have continuous textural uniformity and those which do not. In applying the principal of this invention, the user will attempt to first assemble the toy using only those parts which have the same outer surface characteristic. Secondly, the user will be expected to recognize whether he has assembled the toy correctly or not by tactually distinguishing whether the assembled toy has, or has not, a continuous textural uniformity. The complexity or simplicity of the sets of parts to be assembled and the ease or difficulty of differentiation of the textures used would be determined on the basis of the age and condition of the user and on the degree of skill to be imparted. It is preferable, in almost all cases, to include at least two complete sets of interlocking parts. Since the corresponding parts of each set are substantially the same except for the surface texture characteristic, the user correctly solves the puzzle of the toy by constructing two similar objects each of which has a different continuously textured outer surface.

In its simplest form, wherein the textural differences are bold and distinct, this toy can be used by very young children with educational benefit and enjoyment. In its more complex form, in which the textural differences are only slightly different in kind or degree, this toy can be used by a variety of age groups for a number of purposes. Children, youths, and adults can use these toys to develop their digital dexterity and tactile differentiation powers to a high degree in an enjoyable manner. They can also use the toy as a party game device wherein participants compete against each other or against a clock to achieve correct assembly in the quickest time.

This toy would also have wide application as a tool in the physiological and psychological testing and training fields. In the first instance, the user can demonstrate and develop his tactile apperception and differentiation skills by correct assembly or quick identification of objects whose plurality of parts are distinguished by progressively precise degrees of textural continuity or progressively finer degrees of textural difference. In cruder form, the toy can be used also as physiological training device for improving digital mobility and coordination. In psychological testing and training, much benefit can be derived by the user merely from the tactile training nature of the toy. In brain damage cases, wherein tactile training is used to promote the development of peripheral cells to perform the function of damaged cells, the assembled toys could be used in progressive degrees of refinement to train the user. In this same realm, much interesting data can be obtained by a trained analyst studying a subject's proclivities, penchants, and predispositions in the matter of assembly or as he reacts towards particular textures or admixtures of textures.

The feature of these tactile toys which allows segregation and assembly by sense of touch alone would be quite advantageous in training blind persons to develop their sense of touch and tactile differentiation to a high degree.

Other applications of this invention will be evident in the light of the following description. It should be emphasized, at this point, that the invention described and claimed herein comprises a device which is composed of a plurality of parts capable of assembly and disassembly in which each individual part has, inter alia, an exterior surface, which is the facing surface of the assembled object, all areas of which exterior surface have a distinct and similar texture and which plurality of parts also include one or more additional parts which are substantially identical to one or more of said plurality of parts in every regard except that said additional part or parts have exterior surfaces all areas of which have a distinct texture which is different from that of the other parts in the plurality of parts.

These tactile toys may be made in a great variety of shapes. Although not essential, it is preferable that these shapes be readily recognizable such as, for example, in geometric, morphologic, and free form. The geometric shapes include spheres, discs, cubes, cones, parallelepipeds, pyramid frusta, cylinders, and the like. The morphologic shapes would include those of human, animal, fish, fowl, or birds. Free form shapes would be those found in rocks, plants, and such other formations.

A variety of different surface textures are available for selection as the outer surfaces of the various shapes.

Smooth, pebbled, grainy, pocked, grooved, ribbed, spined and many variations thereof are available for use as textures to distinguish the surfaces in any given toy.

Any of the common and well-known interlocking arrangements or combinations thereof could be used. It is important, of course, that the method of interlocking be consistent throughout the parts used in any set.

This invention will be more clearly understood by referring to the attached drawings in which.

Figure 1A:
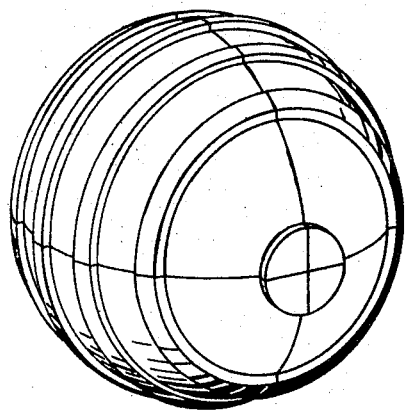
FIG. 1A is a perspective view of the parts shown in FIG. 1 assembled into a sphere.
Figure 1:
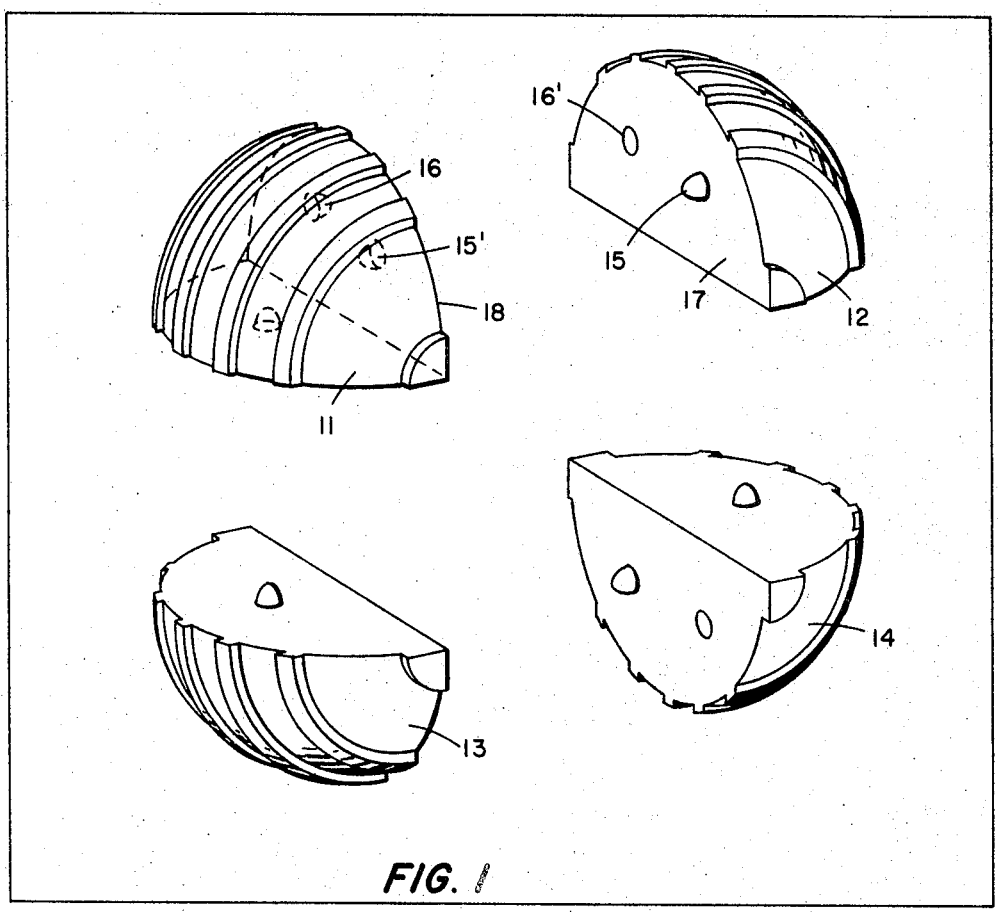
FIG. 1 is a perspective view, in section, of the parts of one geometric toy.

Referring first to FIG. 1, a plurality of parts are shown which, when correctly assembled, form the sphere shown in FIG. 1A. In this example, four interlocking parts, 11 through 14 inclusive, make up the sphere with interlocking prong-in-hole connections used to hold the separate parts together. On surface 17 of part 12 there are a prong 15 and a hole 16' which mate with a corresponding hole 15' and prong 16 on surface 18 of part 11. Other holes and prongs on the butting surfaces of parts 11 through 14 provide for interconnection of all of the parts into the whole object shown in FIG. 1A.

Figure 2A:
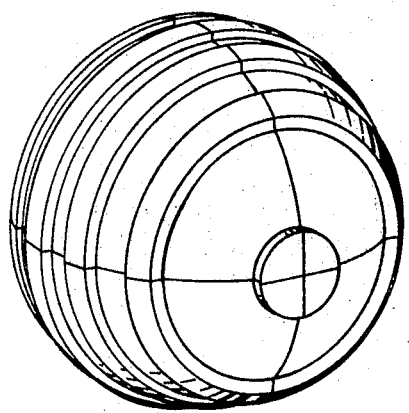
FIG. 2A is a perspective view of the parts in FIG. 2 assembled into a second sphere.

As shown in FIG. 1A, the assembled toy has a spherical geometric shape. From FIG. 1, it can be seen that the surfaces of the parts which make up the sphere are characterized by a series of equidistant raised ridges of consistent width regularly distributed about the surface of the sphere in concentric circles. It is this characteristic texture which distinguishes the individual parts which, when combined, give the assembled shape a consistent and distinct texture. In FIG. 2A, a similar sphere is shown in which the distinct texture is contributed by a series of raised ridges of greater width distributed regularly about the surface of the sphere in concentric circles.

Figure 2B:
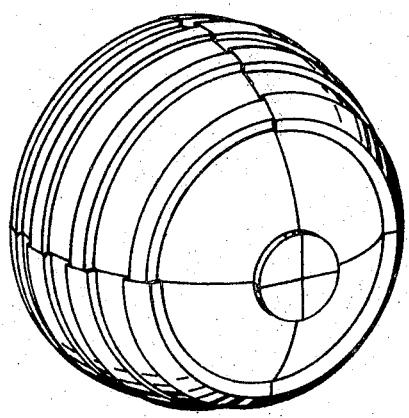
FIG. 2B is a perspective view of the parts of FIGS. 1 and 2 "incorrectly" assembled.
Figure 2:
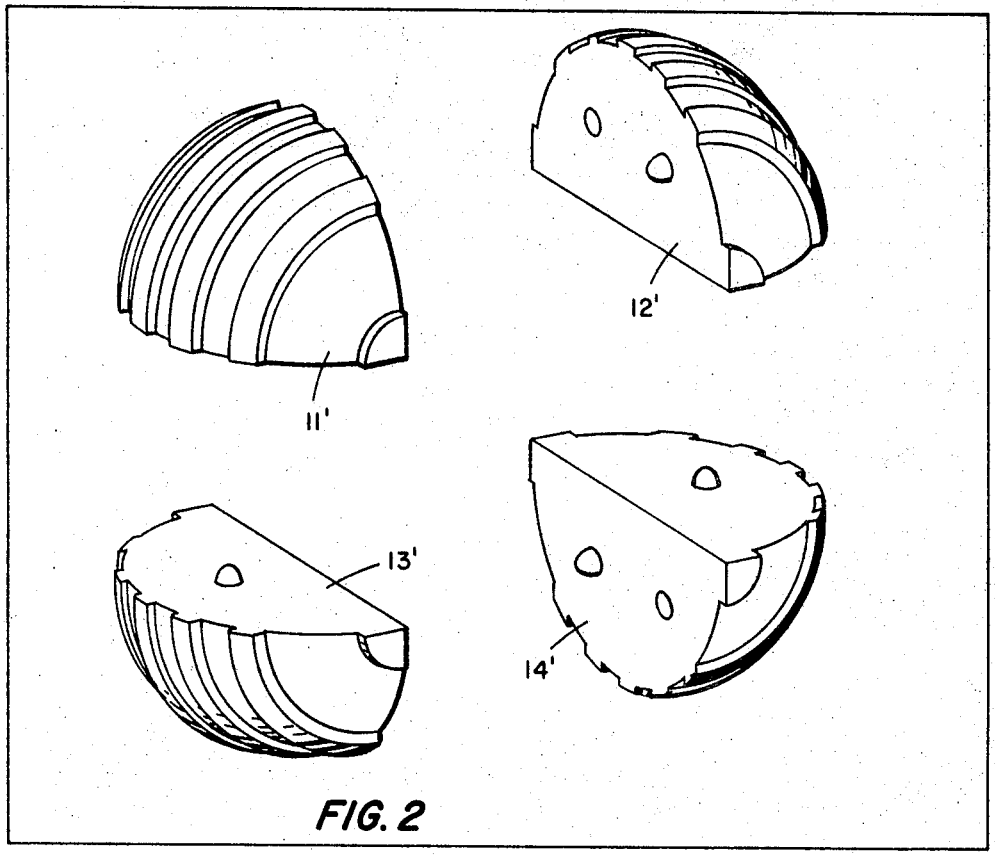
FIG. 2 is a perspective view of the parts of a toy essentially identical to those of FIG. 1 but having a different surface texture.

The parts 11' through 14' that make up the sphere of FIG. 2A are shown in FIG. 2. As will be noted, these parts are essentially identical and interchangeable with parts 11 through 14 of the sphere shown in FIG. 1 except for the difference in texture on the surface areas of the parts that make up the two spheres. It is this textural difference that is used to isolate the parts that belong to each sphere and which is used to establish that the puzzle toy has or has not been assembled properly. FIG. 2B shows a perspective view of a sphere assembled "incorrectly" from four separate parts taken from the two spheres shown in FIGS. 1 and 2.

The difficulty of assembling these toys correctly and of determining which plurality of parts should be used to assemble a given shape and which additional part or parts should be excluded is accomplished primarily by the sense of touch. Naturally, the degree of difficulty in tactile identification of the characteristic texture of the different parts and the ease or difficulty of correct assembly of the puzzle will be varied in accordance with the age and physiological condition of the user and with the skills-training sought.

Figure 3:
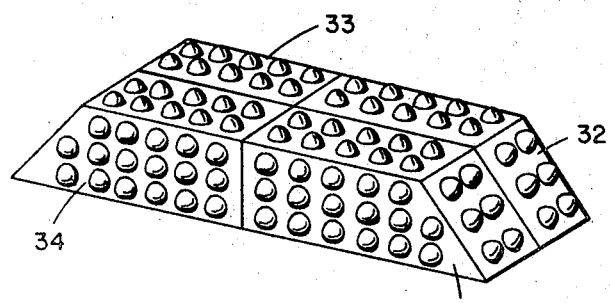
FIG. 3 is a perspective view of a pyramid frustum.

FIG. 3 shows another example of a tactile toy of geometric form in which four interlocking parts, 31 to 34 inclusive, with a regularly distributed and uniform pebble on the facing surfaces make a form which is identified by a characteristic surface texture. With this set would be included one or more parts of a similar form, not shown, in which four essentially identical parts with different surface texture, possibly irregularly pebbled, interlock in an identical manner to form a second toy.

Figure 4:
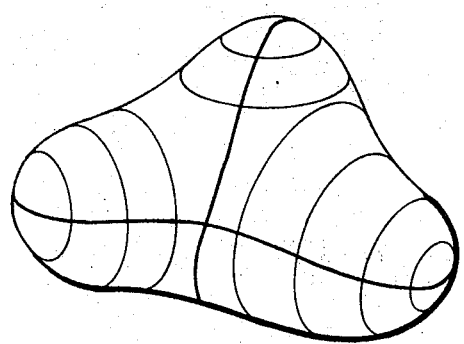
FIG. 4 is a perspective view of a free form shape.
Figure 5:
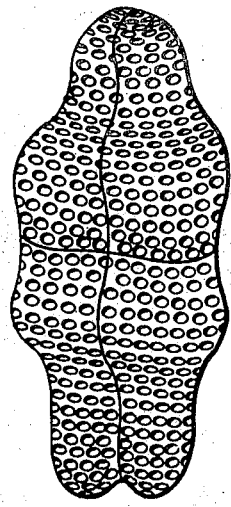
FIG. 5 is a perspective view of one of the toys in the shape of a pseudo-human.

FIGS. 4 and 5 show perspective views of a representative free form shape and of a representative morphologic shape, respectively. In FIG. 4 a free form shape similar to a rock is shown as being comprised of four interlocking parts which, in accordance with the teachings of this invention, can be assembled and disassembled. The surface texture of this free form is shown as a series of regularly inscribed contour lines representative of uniform gradations of thickness generally disposed regularly about the major axis. An additional part or parts of a substantially identical free form, not shown, having the same number and shaped pieces with identical interlocks but a different-polished, perhaps-surface texture would be included with this toy.

FIG. 5 shows a morphologic shape of a general human outline. In this toy, four interlocking parts whose facing surfaces have a uniformly distributed pock of shallow depth would be included with one or more essentially identical interlocking parts, not shown, whose facing surfaces had a different-smooth, perhaps-texture.

Figure 6:
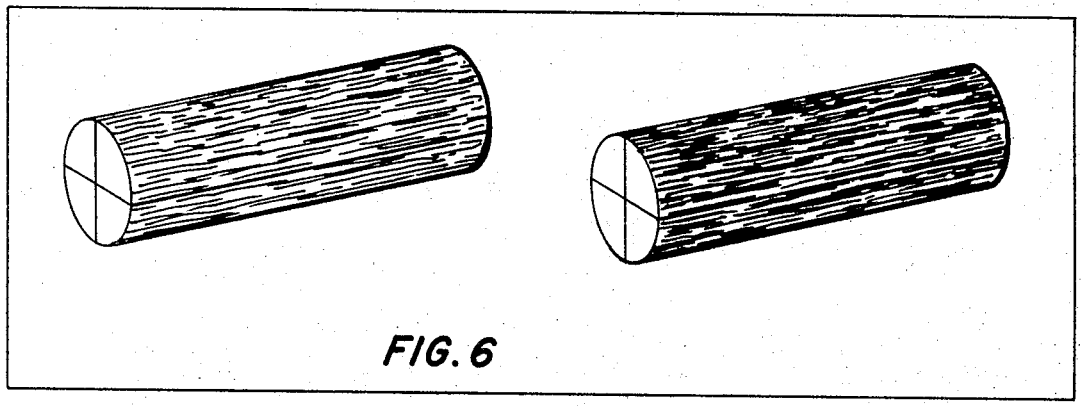
FIG. 6 is a perspective view of two of the toys in the shape of logs.

FIG. 6 shows a perspective view of two tactile toys in the shape of logs of equal size and shape and of equal number of identical interlocking parts in which two different degrees of grooved surface, like bark, distinguish the separate logs. Differentiation of the parts that make up the separate log shapes would be accomplished by feeling the different bark-type textures. Correct assembly would be accomplished by segregating and by interlocking the rougher, coarser, bark parts in a log separate from one made up of the less rough, less coarse, interlocking pieces.

Although I have used specific embodiments and detailed examples to explain my invention, it is evident that the inventive concept is not so limited. Many variations and modifications will occur to those skilled in this art and all such are deemed to fall within the spirit and scope of my invention as defined in the following claims.

I claim:

1. A tactile toy comprising a solid sphere having a uniform outer surface texture characteristic, said sphere having a plurality of parts each having a portion of said outer surface, means for interlocking said plurality of parts into said sphere, and at least one additional part substantially identical to one of said plurality of parts except having a different outer surface texture characteristic.

2. A tactile toy comprising a solid form of morphologic shape having a uniform outer surface texture characteristic, said form having a plurality of parts each having a portion of said outer surface, means for interlocking said plurality of parts into said solid form, and at least one additional part substantially identical to one of said plurality of parts except having a different outer surface texture characteristic.

3. A tactile toy as claimed in claim 2 in which said morphologic shape is pseudo-human.

4. A tactile toy comprising a solid form having a uniform outer surface texture characteristic with raised ridges spaced a uniform predetermined distance apart, said form having a plurality of parts each having a portion of said outer surface, means for interlocking said plurality of parts into said solid form, and at least one additional part substantially identical to one of said plurality of parts except having an outer surface with raised ridges uniformly spaced a greater distance apart than those of said form.

5. A tactile toy comprising a solid form having a uniform outer surface texture characteristic with randomly distributed grooves spaced in a predetermined pattern, said form having a plurality of parts each having a portion of said outer surface, means for interlocking said plurality of parts into said solid form, and at least one additional part substantially identical to one of said plurality of parts except having an outer surface with randomly distributed grooves of less depth and closer spacing than those of said form.

6. A tactile toy comprising a solid form having a uniform outer surface texture characteristic with regularly distributed raised bumps, said form having a plurality of parts each having a portion of said outer surface, means for interlocking said plurality of parts into said solid form, and at least one additional part substantially identical to one of said plurality of parts except having an outer surface with irregularly distributed raised bumps of larger diameter than those of said form.

7. A tactile toy comprising a solid form having a uniform outer surface texture characteristic with a regularly distributed pattern of minute depressions, said form having a plurality of parts each having a portion of said outer surface, means for interlocking said plurality of parts into said solid form, and at least one additional part substantially identical to one of said plurality of parts except having a smooth outer surface.

References Cited

UNITED STATES PATENTS

| | | | |
|---|---|---|---|
| 451,105 | 4/1891 | Bourne | 40—142UX |
| 2,031,194 | 2/1936 | Thompson | 46—25 |
| 609,347 | 8/1898 | Von Holzhausen | 273—157 |
| 3,010,723 | 11/1961 | Moss | 273—157 |
| 3,117,384 | 1/1964 | Billis | 35—73 |

FOREIGN PATENTS

| | | | |
|---|---|---|---|
| 994,566 | 8/1951 | France | 35—18 |

OTHER REFERENCES

"Synthetic Casualties," Bulletin No. 28 of the Alderson Research Laboratories, Inc., rec'd September 1960, pp. 10 and 15 only relied on.

HARLAND S. SKOGQUIST, Primary Examiner

U.S. Cl. X.R.

35—8; 273—157